United States Patent [19]

Sugimori et al.

[11] Patent Number: 4,683,078
[45] Date of Patent: Jul. 28, 1987

[54] DIHALOGENO-AROMATIC COMPOUND

[75] Inventors: Shigeru Sugimori, Fujisawa; Yasuyuki Goto; Tetsuya Ogawa, both of Yokohama, all of Japan

[73] Assignee: Chisso Corporation, Japan

[21] Appl. No.: 836,126

[22] Filed: Mar. 4, 1986

[30] Foreign Application Priority Data

Mar. 12, 1985 [JP] Japan .................................. 60-48548

[51] Int. Cl.⁴ ...................... C09K 19/34; C09K 19/30; C09K 19/12; C07D 239/02; C07C 69/76; C07C 69/74
[52] U.S. Cl. ............................ 252/299.61; 252/299.5; 252/299.62; 252/299.63; 252/299.66; 252/299.65; 252/299.67; 350/350 R; 350/350 S; 544/299; 544/296; 544/298; 544/318; 544/335; 549/370; 549/372; 549/374; 549/375; 558/270; 560/59; 560/72; 560/73; 560/102; 560/1; 560/107; 560/108; 560/116; 560/118; 560/105; 560/120; 560/126; 560/141; 560/55
[58] Field of Search .................... 560/59, 72, 73, 55, 560/102, 105, 107, 108, 118, 116, 120, 126, 1, 141; 558/270; 252/299.5, 299.65, 299.63, 299.66, 299.61, 299.62; 350/350 R, 350 S; 549/370, 372, 374, 375; 544/296, 318, 335, 294, 298

[56] References Cited

U.S. PATENT DOCUMENTS

| | | | |
|---|---|---|---|
| 4,029,594 | 6/1977 | Gavrilovic et al. | 252/299.65 |
| 4,198,312 | 4/1980 | Sato et al. | 252/299.67 |
| 4,311,610 | 1/1982 | Zaschke et al. | 252/299.61 |
| 4,340,498 | 7/1982 | Sugimori et al. | 252/299.63 |
| 4,358,393 | 11/1982 | Zaschke et al. | 252/299.61 |
| 4,368,135 | 1/1983 | Osman | 252/299.63 |
| 4,399,298 | 8/1983 | Sugimori et al. | 252/299.63 |
| 4,402,855 | 9/1983 | Zann et al. | 252/299.65 |
| 4,424,371 | 1/1984 | Hsu | 252/299.61 |
| 4,455,261 | 6/1984 | Sasaki et al. | 252/299.67 |
| 4,473,487 | 9/1984 | Romer et al. | 252/299.63 |
| 4,490,276 | 12/1984 | Hsu | 252/299.61 |
| 4,490,305 | 12/1984 | Eidenschink et al. | 252/299.63 |
| 4,502,974 | 3/1985 | Sugimori et al. | 252/299.63 |
| 4,510,069 | 4/1985 | Eidenschink et al. | 252/299.61 |
| 4,542,230 | 9/1985 | Gray et al. | 252/299.65 |
| 4,545,922 | 10/1985 | Eidenschink et al. | 252/299.63 |
| 4,548,731 | 10/1985 | Sugimori et al. | 252/299.63 |
| 4,550,981 | 11/1985 | Petrzilka et al. | 252/299.63 |
| 4,551,264 | 11/1985 | Eidenschink et al. | 252/299.63 |
| 4,551,280 | 11/1985 | Sasaki et al. | 252/299.63 |
| 4,564,694 | 1/1986 | Hirai et al. | 252/299.61 |
| 4,565,425 | 1/1986 | Petrzilka et al. | 252/299.61 |
| 4,581,155 | 4/1986 | Goto et al. | 252/299.61 |
| 4,621,901 | 11/1986 | Petrzilka et al. | 252/299.63 |

FOREIGN PATENT DOCUMENTS

| | | | |
|---|---|---|---|
| 19665 | 12/1980 | European Pat. Off. | 252/299.63 |
| 149238 | 7/1985 | European Pat. Off. | 252/299.61 |
| 154840 | 9/1985 | European Pat. Off. | 252/299.61 |
| 3315295 | 10/1984 | Fed. Rep. of Germany | 252/299.61 |
| 3404116 | 8/1985 | Fed. Rep. of Germany | 252/299.61 |
| 57-64645 | 4/1982 | Japan | 252/299.63 |
| 57-91953 | 6/1982 | Japan | 252/299.63 |
| 57-154158 | 9/1982 | Japan | 252/299.63 |
| 58-13544 | 1/1983 | Japan | 252/299.63 |
| 58-121247 | 7/1983 | Japan | 252/299.63 |
| 58-126838 | 7/1983 | Japan | 252/299.63 |
| 58-148875 | 9/1983 | Japan | 252/299.63 |
| 59-82382 | 5/1984 | Japan | 252/299.61 |
| 59-216876 | 12/1984 | Japan | 252/299.61 |
| 60-109569 | 6/1985 | Japan | 252/299.61 |
| 60-204780 | 10/1985 | Japan | 252/299.61 |

Primary Examiner—Teddy S. Gron
Attorney, Agent, or Firm—Leydig, Voit & Mayer

[57] ABSTRACT

A novel liquid crystal compound suitable to use as a component of liquid crystal dielectrics and a liquid crystal composition containing the same are provided, which compound is a dihalogeno-aromatic compound expressed by the formula

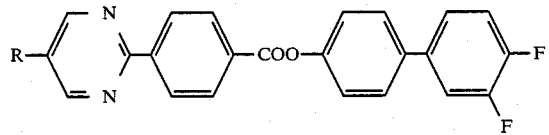

wherein R represents an alkyl group or an alkoxy group, each of 1 to 12 carbon atoms, or an alkoxymethyl group of 2 to 12 carbon atoms.

2 Claims, No Drawings

DIHALOGENO-AROMATIC COMPOUND

BACKGROUND OF THE INVENTION

This invention relates to a novel dihalogeno-aromatic compound as a liquid crystal compound and a liquid crystal composition containing the same.

Liquid crystal display elements utilize the optical anisotropy and dielectric anisotropy of liquid crystal substances, and the liquid crystal phases thereof include the nematic phase, the smectic phase and the cholesteric phase. Further, display elements utilizing crystals of the nematic liquid phase among the above liquid crystal phases have been most broadly employed for practical use. Such display elements are classified into those of various modes such as TN type (twisted nematic type), DS type (dynamic scattering type), guest-host type, etc., and properties required for liquid crystal compounds used therefor vary. At any rate, liquid crystal compounds used for these display elements are preferred to exhibit liquid crystal phases within a temperature range as broad as possible, and also are required to be stable to moisture, light, heat, air, etc. However, at present there is no single substance which satisfies all of such conditions; thus liquid crystal compositions obtained by blending several kinds of liquid crystal compounds and if necessary, compounds similar to liquid crystals have been employed for practical use.

SUMMARY OF THE INVENTION

The object of the present invention is to provide a novel liquid crystal compound suitable for use as a component of liquid crystal dielectrics and a liquid crystal composition containing the same.

The present invention in a first aspect resides in a dihalogeno-aromatic compound expressed by the formula

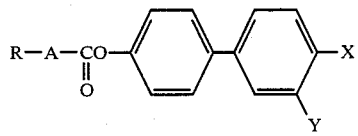
(I)

wherein R represents hydrogen, an alkyl group or an alkoxy group, each of 1 to 12 carbon atoms, or an alkoxymethyl group of 2 to 12 carbon atoms; X and Y each represent F, Cl or Br; and A represents either a single bond, one divalent group selected from the group of divalent groups consisting of methylene group, 1,4-phenylene group, cyclohexane-1,4-diyl group, bicyclo[2.2.2]octane-1,4-diyl group, 1,3-dioxane-2,5-diyl group and pyrimidine-2,5-diyl group, or a divalent group obtained by bonding two divalent groups selected from said group of divalent groups, the two divalent groups being the same of different.

The present invention in a second aspect resides in a liquid crystal composition comprising at least two components at least one of which is a dihalogeno-aromatic compound expressed by the above-formula (I).

DETAILED DESCRIPTION OF PREFERRED EMBODIMENTS

Among the compounds of the present invention, those of the formula (I) wherein X and Y each are F or Cl are preferred and particularly those of the formula (I) wherein X and Y are both F are more preferred due to their low viscosity. Further, the alkyl group, alkoxy group or alkoxymethyl group as the above R in the formula (I) is preferred to have a linear carbon chain. On the other hand, compounds of the formula (I) wherein R has a branched carbon chain are superior in compatibility with other liquid crystal compounds or liquid crystal compositions already generally used; hence they are sometimes important.

Examples of the compounds of the present invention which are particularly preferred as a component of materials for liquid crystal display elements are as follows:

3,4-difluoro-4'-biphenylyl trans-4-alkylcyclohexanecarboxylate, 3,4-difluoro-4'-biphenylyl trans-4-alkoxycyclohexanecarboxylate, 3,4-difluoro-4'-biphenylyl trans-4-alkoxymethylcyclohexanecarboxylate, 3,4-difluoro-4'-biphenylyl p-alkylbenzoate, 3,4-difluoro-4'-biphenylyl p-alkoxybenzoate, 3,4-difluoro-4'-biphenylyl p-alkoxymethylbenzoate, 3,4-difluoro-4'-biphenylyl trans-4-(trans-4-alkylcyclohexyl)cyclohexanecarboxylate, 3,4-difluoro-4'-biphenylyl trans-4-(trans-4-alkoxycyclohexyl)cyclohexanecarboxylate, 3,4-difluoro-4'-biphenylyl trans-4-(trans-4-alkoxymethylcyclohexyl)cyclohexanecarboxylate, 3,4-difluoro-4'-biphenylyl p-(trans-4-alkylcyclohexyl)benzoate, 3,4-difluoro-4'-biphenylyl p-(trans-4-alkoxycyclohexyl)benzoate, 3,4-difluoro-4'-biphenylyl p-(trans-4-alkoxymethylcyclohexyl)benzoate, 3,4-difluoro-4'-biphenylyl p-(p-alkylphenyl)benzoate, 3,4-difluoro-4'-biphenylyl p-(p-alkoxyphenyl)benzoate, 3,4-difluoro-4'-biphenylyl p-(p-alkoxymethylphenyl)benzoate, 3,4-difluoro-4'-biphenylyl trans-4-(p-alkylphenyl)cyclohexanecarboxylate, 3,4-difluoro-4'-biphenylyl trans-4-(p-alkoxyphenyl)cyclohexanecarboxylate, 3,4-difluoro-4'-biphenylyl trans-4-(p-alkoxymethylphenyl)cyclohexanecarboxylate, 3,4-difluoro-4'-biphenylyl p-(5-alkyl-2-pyrimidinyl)benzoate, 3,4-difluoro-4'-biphenylyl p-(5-alkoxy-2-pyrimidinyl)benzoate, 3,4-difluoro-4'-biphenylyl p-(5-alkoxymethyl-2-pyrimidinyl)benzoate, 3,4-difluoro-4'-biphenylyl p-(trans-5-alkyl-1,3-dioxan-2-yl)benzoate, 3,4-difluoro-4'-biphenylyl p-(trans-5-alkoxy-1,3-dioxan-2-yl)benzoate, and 3,4-difluoro-4'biphenylyl p-(trans-5-alkoxymethyl-1,3-dioxan-2-yl)benzoate.

In the above general examples, the alkyl group and the alkoxy group have 1 to 12 carbon atoms, respectively and the alkoxymethyl group has 2 to 12 carbon atoms.

The compounds of the present invention are high temperature liquid crystals having a broad mesomorphic range, and when they are used as a component of liquid crystal compositions, they have a function of raising the clearing points of the compositions. Further, since the compounds of the present invention have a large, positive dielectric anisotropy value (Δε), it is possible to reduce the driving voltage of liquid crystal display elements using a liquid crystal composition containing the compounds as its component.

Furthermore, the compounds have a low viscosity; hence when used as a nematic liquid crystal material, they do not prolong so much the response time, particularly the decay time, of liquid crystal display elements.

The compounds of the present invention may be prepared by reacting a reactive derivative of a carboxylic acid of the formula (II), preferably a carboxylic acid chloride, with a 3,4-dihalogeno-4'-hydroxybiphenyl (III).

$$R-A-COOH \quad (II)$$

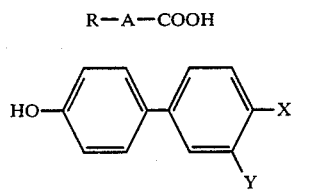

This reaction may be carried out at a temperature of 0° to 150° C., preferably 60° to 110° C., in an inert solvent such as hydrocarbon solvents e.g. benzene, toluene, etc. and relatively high boiling solvents e.g. tetrahydrofuran, isopropyl ether, etc. Further, when an acid chloride is used as raw material, it is preferred to add a base such as pyridine, triethylamine or the like to the reaction system to neutralize hydrogen chloride formed during the reaction.

The phenols of the formula (III) may be obtained e.g. according to the following method:

A p-methoxyphenylmagnesium halide as a Grignard reagent, obtained from a p-halogenoanisole (IV), is reacted with a 3,4-dihalogeno-1-iodobenzene (V) at a low temperature in the vicinity of 0° C. in an ether solvent in the presence of Ni catalyst to obtain a 3,4-dihalogeno-4'-methoxybiphenyl (VI), which is then reacted with HBr to obtain (III). These reactions are expressed by the following reaction equations:

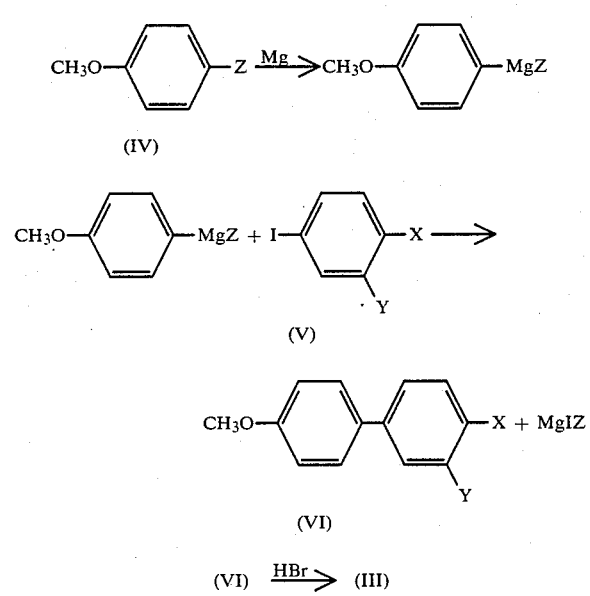

In the above equations, X and Y are as defined above and Z represents Cl, Br or I.

Carboxylic acids of the formula (II) wherein A is a single bond or a divalent group consisting of one ring are known, and carboxylic acids of the formula (II) wherein A is a divalent group consisting of two rings are also known. For example carboxylic acids of the formula (II) wherein A is

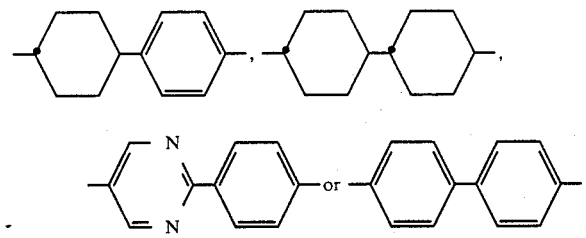

are respectively easily obtained by hydrolyzing the corresponding nitriles described in Japanese patent publication Nos. Sho 56-38146/1981, Sho 59-4420/1984, Sho 555-6632/1980 and Sho 53-44153/1978, and carboxylic acids of the formula (II) wherein A is

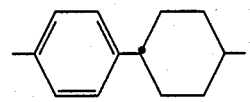

are obtained, by reducing the 4'-substituted-4-biphenylcarboxylic acids.

Further, carboxylic acids of the formula (II) wherein A is

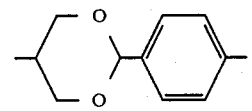

are disclosed in Japanese patent application laid-open No. Sho 58-148875/1983.

Carboxylic acids of the formula (II) wherein A consists of two rings, but other than the above-mentioned carboxylic acids, may be easily obtained according to the methods disclosed in the above publications or other known methods of organic synthesis.

The liquid crystal compositions of the present invention comprises at least two components at least one of which is a dihalogeno-aromatic compound expressed by the formula (I).

The content of the compound of the formula (I) in the liquid crystal composition of the present invention may vary depending on the kinds of other component compounds employed and the applications of the composition. For example, in the case where the compound of the formula (I) is singly blended with trans-4-alkylcyclohexylbenzonitriles, the content of the compound of the formula (I) in the composition is preferably 1 to 30% by weight, more preferably 5 to 20% by weight.

As other compounds used in the composition of the present invention, those selected from the group consisting of compounds expressed by the following formulas may be exemplified.

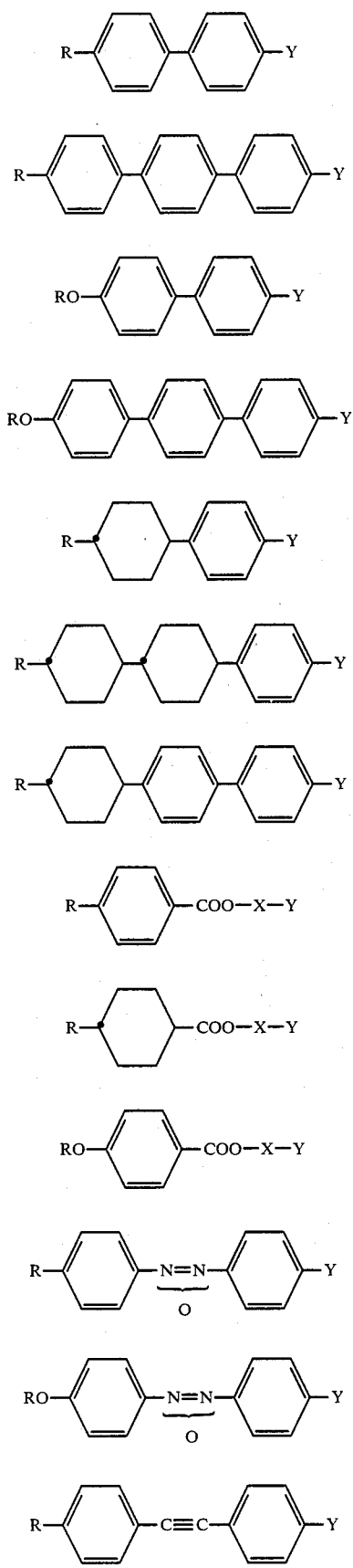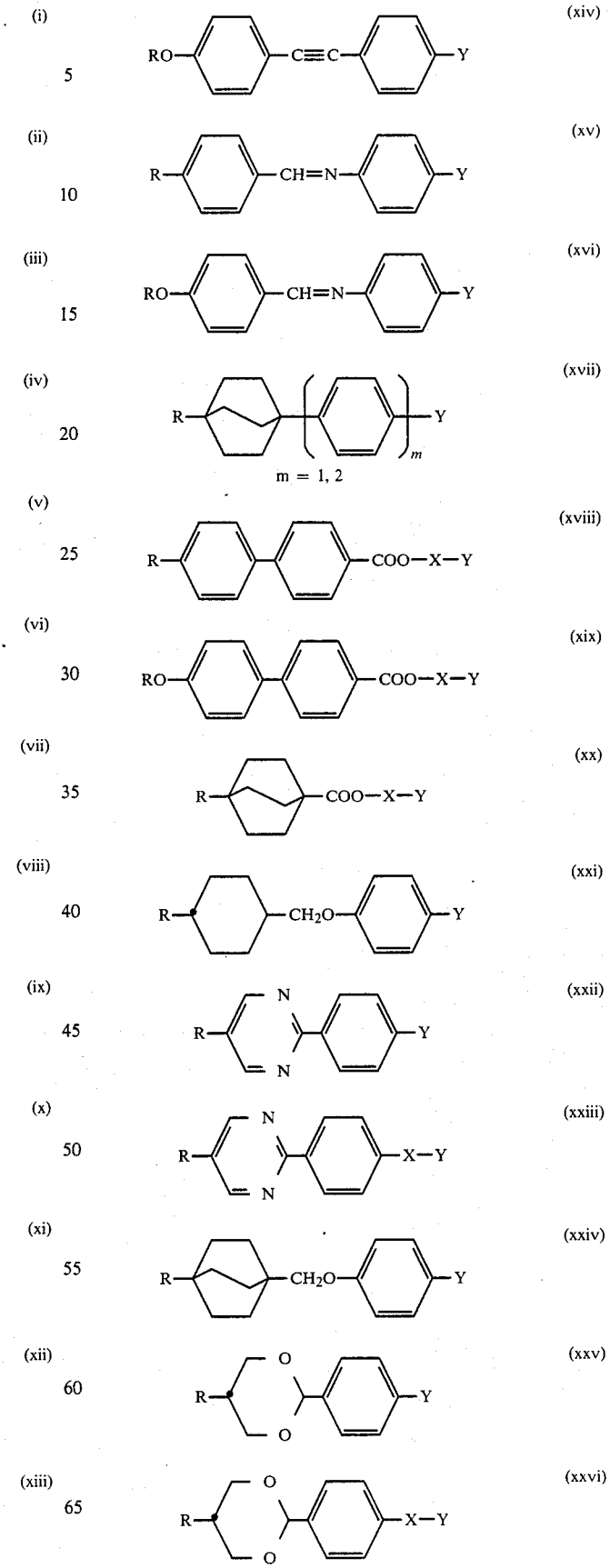

-continued

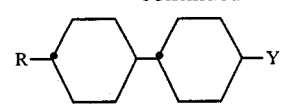
(xxvii)

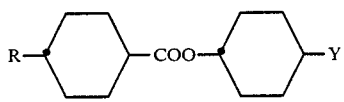
(xxviii)

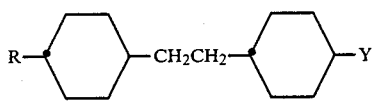
(xxx)

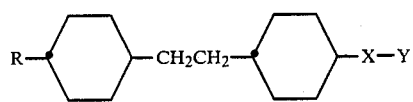
(xxxi)

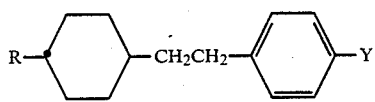
(xxxii)

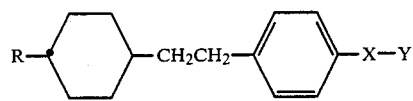

wherein X represents

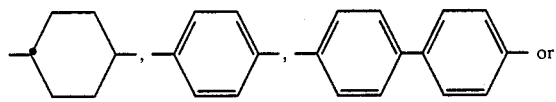 or

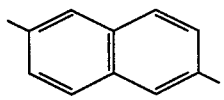 ;

Y represents CN, halogen, R' or OR'; and R and R' each represent an alkyl group.

In an example, a liquid crystal composition obtained by adding a compound of the formula (I) to a mixture of trans-4-alkylcyclohexylbenzonitriles of the formula (v) is a well-balanced liquid crystal material having an elevated clearing point and demonstrating inhibition of increased viscosity.

The present invention will be described in more detail by way of Examples, but is should not be construed to be limited thereto.

EXAMPLE 1

3,4-Difluoro-4'-biphenylyl trans-4-propylcyclohexanecarboxylate 3,4-Difluoro-4-hydroxybiphenyl (2.0 g, 10 mmols) was dissolved in dried pyridine (5 cc), followed by adding to the solution, a solution obtained by dissolving trans-4-propylcyclohexanecarboxylic acid chloride (2 g, 11 mmols) in dry toluene (10 cc), heating the mixture at 60° C. for 3 hours with stirring, then adding the resulting material to water (100 cc), then washing the separated toluene layer with 6N hydrochloric acid, 2N aqueous solution of NaOH and further with water, distilling off toluene from the toluene layer, and recrystallizing the residual crystals from ethyl acetate (10 cc) to obtain the objective 3,4-difluoro-4'-biphenylyl trans-4-propylcyclohexanecarboxylate (2.5 g, 70%).

This product exhibited liquid crystalline phases, and C-S point (crystalline-smectic phase transition point): 81.6° C.

S-N point (smectic-nematic phase transition point): 87.6° C.

N-I point (nematic-isotropic liquid phase transition point): 143.6° C.

EXAMPLES 2–11

Compounds having other structures were prepared in the same manner as in Example 1. The results are shown in Table 1 together with those of Example 1.

TABLE 1

| Example | In formula (I) R | A | X | Y | Phase transition point (°C.) C | S | N | I |
|---|---|---|---|---|---|---|---|---|
| 1 | C₃H₇ | cyclohexyl | F | F | • 81.6 | • 87.6 | • 143.6 | • |
| 2 | H | CH₂ | F | F | • 95.6 | — | — | • |
| 3 | C₅H₁₁ | cyclohexyl | F | F | • 73.8 | • 102.2 | • 146.3 | • |
| 4 | C₄H₉ | phenyl | F | F | • 85.2 | • 120.8 | • 134.1 | • |
| 5 | C₃H₇ | bicyclohexyl | F | F | • 85.8 | • 136.1 | • 266.2 | • |

TABLE 1-continued

| Example | In formula (I) R | A | X | Y | Phase transition point (°C.) C | S | N | I |
|---|---|---|---|---|---|---|---|---|
| 6 | $C_5H_{11}$ | cyclohexyl-cyclohexyl | F | F | • 96.1 | • 147.6 | • 265.5 | • |
| 7 | $C_3H_7$ | cyclohexyl-phenyl | F | F | • 124.8 | • 159.4 | • 280.3 | • |
| 8 | $CH_3OCH_2$ | cyclohexyl-phenyl | F | F | • 148.6 | • 122.3 | • 279.8 | • |
| 9 | $C_5H_{11}$ | phenyl-phenyl | F | F | • 149.8 | • 243.2 | • 300≦ | • |
| 10 | $C_3H_7$ | dioxane-phenyl | F | F | • 138.8 | — | • 271.5 | • |
| 11 | $C_8H_{17}$ | pyrimidine-phenyl | F | F | • 83.8 | • 238.5 | • 268.1 | • |

In the above Table 1, the Symbols C, S, N and I in the column of phase transition point represent crystalline, smectic, nematic and isotropic liquid phases, respectively; and the symbols . and - represent the presence and absence of the phase thereabove, respectively.

EXAMPLE 12

A liquid crystal composition (A) consisting of

| A | trans-4-propyl-(4-cyanophenyl)cyclohexane 30% by weight, trans-4-pentyl-(4-cyanophenyl)cyclohexane 40% by weight, and trans-4-heptyl-(4-cyanophenyl)cyclohexane 30% by weight |
|---|---| had a N-I point of 52° C., a dielectric anisotropy value Δε of 11.2 and a viscosity at 20° C. [η] of 23.4 cp. To this liquid crystal composition (A) (85 parts by weight) was added, 3,4-difluoro-4'-biphenylyl trans-4propylcyclohexanecarboxylate (15 parts by weight) prepared in Example 1. The resulting liquid crystal composition had a N-I point elevated up to 59.5° C., and nevertheless its [η] remained in a slight increase, that is, 24.5 cp. Further, its Δε was 12.1.

EXAMPLE 13

A liquid crystal composition consisting of trans-4-propyl-(4-cyanophenyl)cyclohexane
    25.5% by weight,
trans-4-pentyl-(4-cyanophenyl)cyclohexane
    34% by weight,
trans-4-heptyl-(4-cyanophenyl)cyclohexane
    25.5% by weight and
3,4-diflouro-4'-biphenylyl trans-4-pentylcyclo- -continued hexanecarboxylate    15% by weight had a N-I point of 60.6° C., a Δε of 12.2 and a viscosity at 20° C. of 25.5 cp.

EXAMPLE 14

A liquid crystal composition consisting of trans-4-propyl-(4-cyanophenyl)cyclohexane
    25.5% by weight,
trans-4-pentyl-(4-cyanophenyl)cyclohexane
    34% by weight,
trans-4-heptyl-(4-cyanophenyl)cyclohexane
    25.5% by weight, and
3,4-diflouro-4'-biphenylyl trans-4-propylcyclo-
hexylbenzoate    15% by weight had a N-I point of 82° C., a Δε of 13.1 and a viscosity at 20° C. of 31 cp.

What we claim is:

1. A difluoro-aromatic compound expressed by the formula

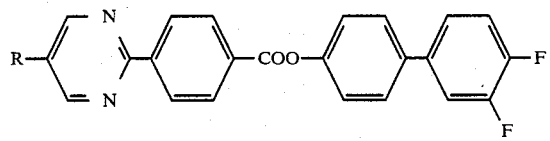

wherein R represents an alkyl group or an alkoxy group, each of 1 to 12 carbon atoms, or an alkoxymethyl group of 2 to 12 carbon atoms.

2. A liquid crystal composition having at least two components, at least one of which is a difluoro-aromatic compound as set forth in claim 1.

* * * * *